United States Patent
Mediate

(10) Patent No.: US 7,475,511 B2
(45) Date of Patent: Jan. 13, 2009

(54) TERMITE PRESENCE MONITOR AND METHOD

(76) Inventor: Donald L. Mediate, Pest Stop, Inc. P.O. Box 92, Arizona City, AZ (US) 85223

(*) Notice: Subject to any disclaimer, the term of this patent is extended or adjusted under 35 U.S.C. 154(b) by 171 days.

(21) Appl. No.: 11/438,413

(22) Filed: May 22, 2006

(65) Prior Publication Data

US 2007/0209271 A1 Sep. 13, 2007

Related U.S. Application Data

(63) Continuation-in-part of application No. 11/370,330, filed on Mar. 8, 2006, now abandoned.

(51) Int. Cl.
*A01M 1/20* (2006.01)
(52) U.S. Cl. ........................ 43/132.1; 43/131
(58) Field of Classification Search ............... 43/132.1, 43/131
See application file for complete search history.

(56) References Cited

U.S. PATENT DOCUMENTS

| | | | | |
|---|---|---|---|---|
| 5,901,496 A | * | 5/1999 | Woodruff | 43/124 |
| 6,016,625 A | * | 1/2000 | Bishoff et al. | 43/121 |
| 6,100,805 A | * | 8/2000 | Lake | 340/573.1 |
| 6,266,918 B1 | | 7/2001 | Henderson et al. | |
| 6,298,597 B1 | * | 10/2001 | Koehler et al. | 43/131 |
| 6,357,170 B1 | * | 3/2002 | Bordes, Jr. | 43/121 |
| 6,370,811 B1 | * | 4/2002 | Masterson | 43/121 |
| 6,374,536 B1 | * | 4/2002 | Washburn | 43/132.1 |
| 6,392,545 B2 | * | 5/2002 | Lake et al. | 340/572.8 |
| 6,397,516 B1 | * | 6/2002 | Su | 43/124 |
| 6,453,603 B1 | * | 9/2002 | Baker | 43/124 |
| 6,612,068 B1 | | 9/2003 | Aesch, Jr. | |

* cited by examiner

Primary Examiner—Kurt Rowan
(74) Attorney, Agent, or Firm—John D. Lister

(57) ABSTRACT

A termite-monitoring device and method for detecting the presence of termites and killing termites by exposing the termites to a termiticide, includes locating the monitoring device in a paving hole or in a termite lure located in the ground adjacent a building. The monitoring device has an integral termite indicator mechanism for indicating the presence of termites within the paving hole or termite lure that provides an aboveground visible indicator that termites are present. The termite indicator mechanism is actuated by a trigger mechanism with a termite food source that, when fed upon by termites, actuates the termite indicator mechanism to indicate the presence of termites. After the indicator has been actuated, a termiticide is introduced into the paving hole, the termite lure, and/or the adjacent ground to expose termites to the termiticide as the termites pass between a termite colony and the paving hole or termite lure and/or feed within the paving hole or termite lure.

20 Claims, 3 Drawing Sheets

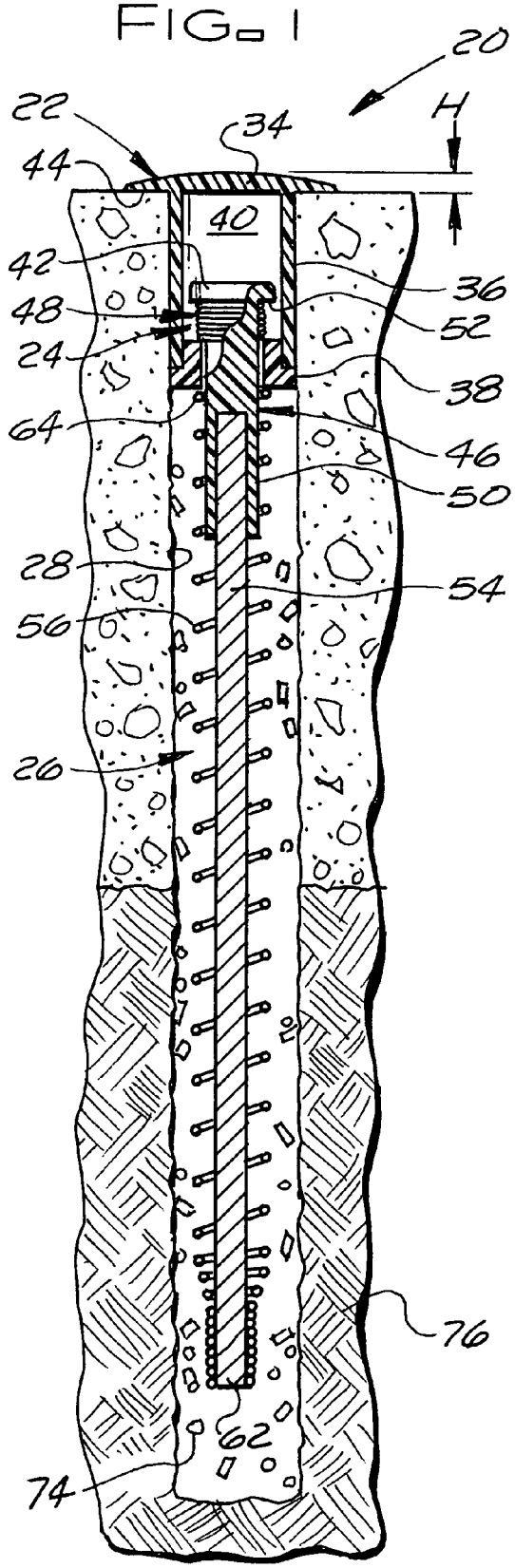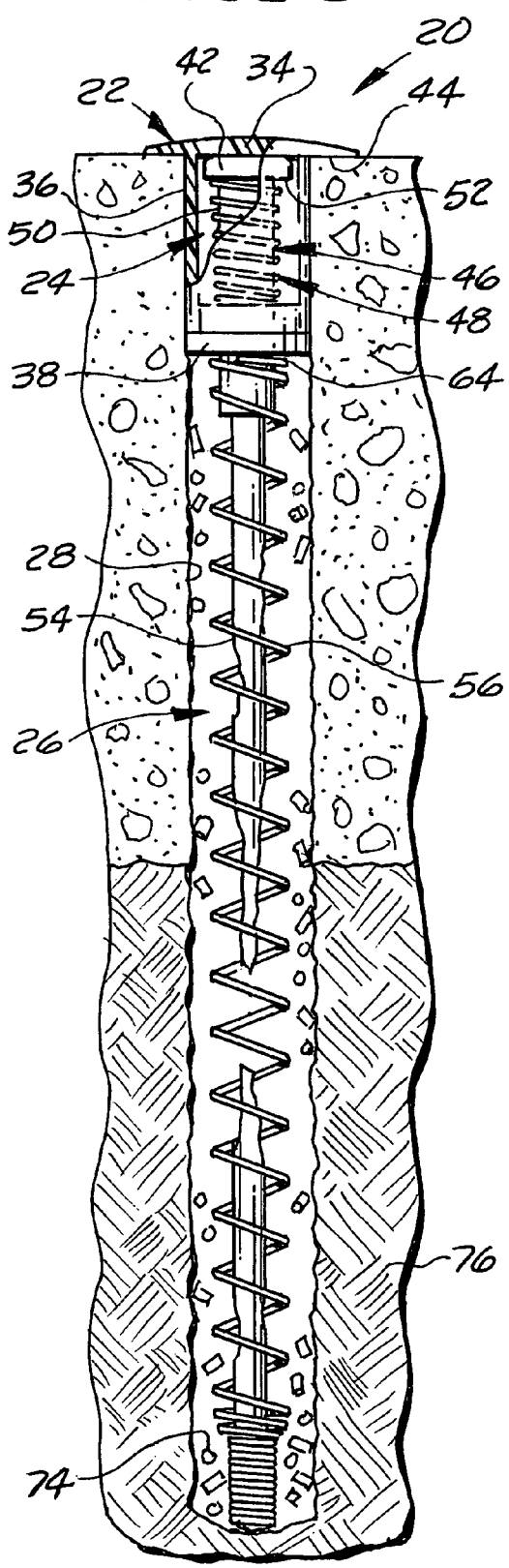

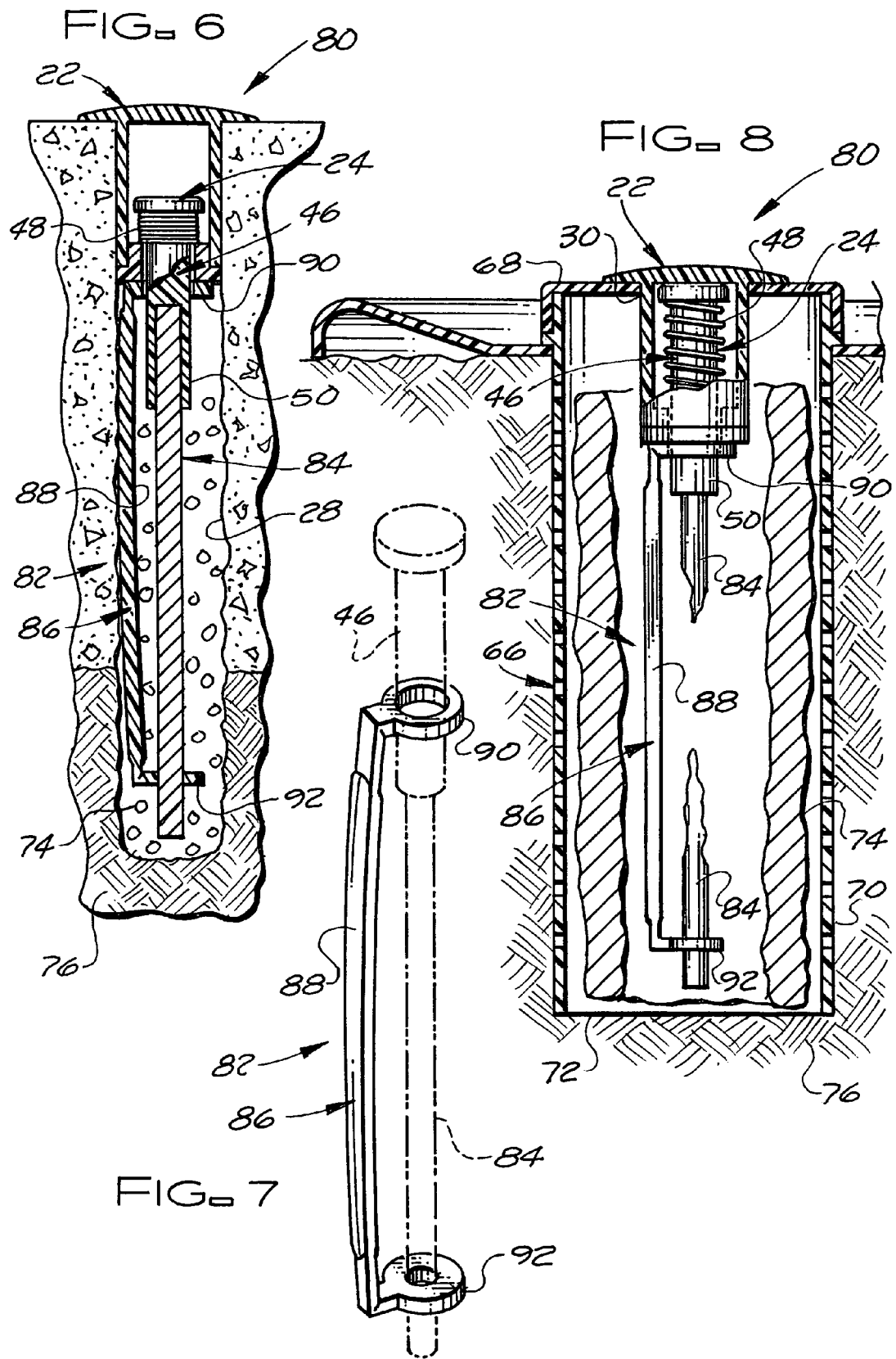

TERMITE PRESENCE MONITOR AND METHOD

This patent application is a continuation-in-part application of patent application Ser. No. 11/370,330, filed Mar. 8, 2006, now abandoned.

BACKGROUND OF THE INVENTION

The subject invention relates to method for monitoring for the presence of termites and exterminating termites once their presence is detected and to a termite-monitoring device that, while it can be used with in-ground termite lures, is especially adapted for use in the detection of termites beneath pavements (e.g. concrete and asphalt pavements such as but not limited to slabs, walkways, and roads).

Termites do more property damage in the United States than hurricanes, earthquakes and vandalism combined. In order to control termites with a toxicant (hereinafter "termiticide"), termites must come in contact with the termiticide. Termites ingress and egress a food source through underground and above ground tunnel tubes which extend between a colony nest and the food source, e.g. a building. These tunnel tubes are climate controlled and impervious to termiticides sprayed on the soil and, for as long as the termites remain sealed within their tunnel tubes, the termites are protected from contact with the termiticides sprayed on the soil.

While many methods and termite-monitoring devices have been used to exterminate termites, a need has remained to provide a method for exterminating termites and termite colonies: that is inexpensive and highly effective, that utilizes a termite presence monitoring device which is inexpensive, easy to use, and visibly indicates the presence of termites with an indicator button that is readily visible and can be monitored from above the monitoring device without disturbing the termites; that does not require the use of a toxic termite food source prior to the detection of termites; that gives the service technician the flexibility of exterminating the termites feeding on a termite food source within a paving hole or termite lure with a termiticide with or without contaminating the termite food source within the paving hole or termite lure; and that, preferably, utilizes a termiticide which is non-repellent to termites and lethal to termites through matrix contact as well as ingestion and/or transferal.

While there has been such a need for the improved detection and extermination of termites both in the ground beneath pavements and in the ground adjacent in-ground termite lures, the need has been especially great with regard to the detection and extermination of termites in the ground beneath pavements (e.g. concrete or asphalt pavements such as but not limited to slabs, walkways, and roads). In many locations, especially in urban environments, office parks, and shopping centers, office, industrial, commercial and other buildings are surrounded or at least partially surrounded by pavements (e.g. concrete and/or asphalt pavements such as but not limited to slabs, walkways, and roads) beneath which termites can pass to gain access to the buildings. Typically, these pavements are concrete slabs about four to six inches thick. One method of treating termites passing under these pavements with termiticides involves boring holes three inches in diameter through the slabs and into the soil beneath the slabs. Wooden sticks about three to four inches long with strings attached thereto are placed down into the holes with the strings extending from the holes so that the sticks can be retrieved when checking for termite activity. Expansible plugs are placed in and seal the upper ends of the holes in the slabs so that rainwater, debris, etc. do not pass down into the holes. The expansible plugs are also used to help keep the strings holding the wooden sticks from falling down into the holes thereby making it hard to retrieve the sticks from the holes to monitor for termite activity. In an improved method disclosed in U.S. Pat. No. 6,612,068 B1, issued Sep. 2, 2003, the expansible plug and wooden stick of the method discussed above are replaced by an expansible plug and termite lure such as shown in FIG. 4 of the '068 patent or an integral expansible plug and termite lure such as shown in FIGS. 5 and 6 of the '068 patent. While the termite lure and method disclosed in the '068 patent are an improvement over the previous termite lure and method discussed above, the termite lure and method disclosed in the '068 patent still require the boring of a series of holes, each about three inches in diameter and on about ten foot center-to-center spacing, through the pavement. The core drills, other drilling equipment, and labor required to drill these three inch diameter holes through the pavement make these methods for detecting and exterminating termites relatively expensive with the formation of these three inch diameter holes typically costing about $12.00/hole. Thus, there has remained a need for a termite-monitoring device and method for detecting and exterminating termites that is easy to practice, effective, and low cost.

SUMMARY OF THE INVENTION

The method and termite-monitoring device of the subject invention accomplish all of the goals listed above. In particular, with respect to the detection and extermination of termites beneath a pavement, the termite-monitoring device of the subject invention only requires the boring of holes through the pavement that are typically about one inch or less in diameter and, preferably, are only about three-quarters of an inch in diameter. This results in a large cost reduction in the core drills, other core drilling equipment, and labor required to form the paving holes in the pavement for the termite-monitoring devices. In addition, with its convex, low profile upper surface design, the closure component of the termite-monitoring device of the subject invention can withstand up to 1500 psi (pounds per square inch) without fracturing and is not susceptible to being caught up by street or pavement cleaning equipment or apparatus so that, in service, the termite-monitoring device is not susceptible to being pulled from a paving hole, damaged, or broken apart by street or pavement cleaning equipment or apparatus. The ability of the closure component of the termite-monitoring device of the subject invention to withstand high levels of pressure without fracturing is important in that the closure components of the termite-monitoring devices of the subject invention can be subjected to high levels of pressure in service, such as but not limited to that produced when the closure components are stepped on by persons wearing shoes with stiletto heels.

In the method of the subject invention for detecting the presence of and exterminating termites by exposing the termites to a termiticide, one or more paving holes, typically a plurality of paving holes spaced apart from each other on about ten foot centers and each extending from an upper surface of a concrete or asphalt pavement (e.g. a concrete or asphalt pavement such as but not limited to a slab, walkway, or road) through the pavement to at least to a bottom surface of the pavement to expose each paving hole to the ground beneath the pavement for termite access to the paving hole are formed in a pavement adjacent a building structure and/or one or more in ground located termite lures, typically a plurality of in-ground located termite lures spaced apart from each other on about ten foot centers and each having a tubular container for containing a termite food source, an above ground exposed upper end surface with a hole open from the upper surface to an interior of the container, and in ground termite access to the container are located in the ground adjacent a building structure. Typically, a termite food source such as but not limited to wood pellets, rolled paper, or a mass of entangled wood fibers, separate from the termite food source of the termite-monitoring device, is placed in each paving hole and/or each termite lure. A termite-monitoring device of the subject invention for indicating the presence of termites within a paving hole or a termite lure is then mounted in each of the paving holes and/or the upper surface holes of each of the termite lures. Once a termite-monitoring device indicates the presence of termites in a paving hole or a termite lure, a termiticide is introduced into the paving hole, the termite lure, and/or the ground adjacent the paving hole or termite lure (including but not limited to the ground beneath the paving hole or termite lure) to expose the termites to the termiticide as the termites pass between a termite colony and the paving hole or termite lure and/or feed within the monitoring device.

A first embodiment of the termite-monitoring device of the subject invention for use in the method of the subject invention includes a closure component, a termite presence indicator mechanism, and a trigger mechanism. The closure component houses the termite presence indicator mechanism. In addition, when the termite-monitoring device is mounted in a paving hole or in an upper surface hole of a termite lure, the closure component closes the upper end opening of the paving hole or the termite lure hole and seals the interiors of these holes from the elements. The closure component includes an upper end portion, a tubular housing portion extending downward from the upper end portion, and a lower end portion. The upper end portion of the closure component closes an upper end and the lower end portion of the closure component closes a lower end of the tubular housing portion of the closure component to form a chamber within the closure component for housing the termite presence indicator mechanism.

The upper end portion of the closure component is sufficiently transparent that an interior of the closure component chamber can be viewed through the upper end portion of the closure component. The upper end portion of the closure component has a greater outside diameter than an outside diameter of the tubular housing portion of the closure component whereby an annular peripheral portion of the upper end portion of the closure component forms an annular flange with a bottom surface for engaging an upper surface of a pavement surrounding and adjacent a paving hole in the pavement into which the termite-monitoring device extends or for engaging an upper end surface of a tubular termite lure container surrounding and adjacent the container hole in the upper end surface the tubular termite lure container into which the termite-monitoring device extends. Preferably, the closure component has a low profile and the upper surface of the closure component is convex rather than planar to strengthen the closure component so that the closure component can withstand high levels of pressure without fracturing.

The termite presence indicator mechanism includes an indicator component and a coil actuating spring. The indicator component has a top indicator button portion and a shank portion depending from the indicator button portion. The indicator button portion of the indicator component is slidably housed within the chamber of the closure component and has a greater outside diameter than an outside diameter of the shank portion of the indicator component whereby an annular peripheral portion of the indicator button portion of the indicator component forms an annular flange extending outward from the shank portion. The coil actuating spring is mounted on the shank portion of the indicator component and extends between a bottom surface of the annular flange of the indicator button portion of the indicator component and an upper surface of the lower end portion of the closure component. The shank portion of the indicator component extends from the chamber of the closure component down through a hole in the lower end portion of the closure component and is slidably received within the hole in the lower end portion of the closure component.

The trigger mechanism includes a rod and a retaining component that is a coil retaining spring. An upper end portion of the rod is secured to the indicator component and the rod extends downward from the indicator component and a bottom surface of the closure component whereby the rod will extend downward into a paving hole in which the termite-monitoring device is mounted or downward into a termite lure container through a hole in an upper end of the lure container in which the termite-monitoring device is mounted. A lower end portion of the coil retaining spring is secured to a lower end portion of the rod. The shank portion of the indicator component extends into and is slideably received within an upper end portion of the coil retaining spring and the upper end of the coil retaining spring engages the bottom surface of the closure component whereby the coil retaining spring retains the coil actuating spring of the termite presence indicator mechanism in a compressed state when the rod is whole. The rod of the trigger mechanism comprises, at least in part, a termite food source portion that when being consumed by termites weakens until the rod is separable at the termite food source portion by opposing forces applied to the rod by the coil retaining spring of the trigger mechanism and the coil actuating spring of the termite presence indicator mechanism. When the rod is separated by the opposing forces of the coil retaining spring of the trigger mechanism and the coil actuating spring of termite presence indicator mechanism, the coil actuating spring moves the indicator component from a retracted position in the chamber where the indicator button is spaced downward from the top end portion of the closure component and less visible through the top end portion of the closure component up through the chamber to an extended position where the indicator button is adjacent the top end portion of the closure component, significantly more visible through the top end portion of the closure component than in the retracted position, and readily visible through the top end portion of the closure component to indicate the presence of termites.

A second embodiment of the termite monitoring device of the subject invention for use in the method of the subject invention is the same as the first embodiment of the termite-monitoring device of the subject invention except for the retaining component of the trigger mechanism. In the trigger mechanism of this second embodiment, the retaining component includes a spacer member with an upper connector element at its upper end for slideably mounting the upper end of the retaining component on the shank portion of the termite presence indicator mechanism and a lower connector at its lower end for securing the lower end of the retaining component to a lower end portion of the rod. An upper end portion of the rod is secured to the indicator component and the rod extends downward from the indicator component and a bottom surface of the closure component whereby the rod will extend downward into a paving hole or a lure container in which the termite-monitoring device is mounted. The lower end portion of the retaining component is secured to the lower end portion of the rod and the upper end of portion of the retaining component engages the bottom surface of the closure component whereby the retaining component retains the coil actuating spring of the termite presence indicator mechanism in a compressed state when the rod is whole. The rod of the trigger mechanism comprises, at least in part, a termite food source portion that when being consumed by termites weakens until the rod is separable at the termite food source portion by opposing forces applied to the rod by the retaining component of the trigger mechanism and the coil actuating spring of the termite presence indicator mechanism. When the rod is separated by the opposing forces of the retaining component of the trigger mechanism and the coil actuating spring of termite presence indicator mechanism, the coil actuating spring moves the indicator component from a retracted position in the chamber where the indicator button is spaced downward from the top end portion of the closure component and less visible through the top end portion of the closure component up through the chamber to an extended position where the indicator button is adjacent the top end portion of the closure component, significantly more visible through the top end portion of the closure component than in the retracted position, and readily visible through the top end portion of the closure component to indicate the presence of termites.

BRIEF DESCRIPTION OF THE DRAWINGS

FIG. 1 is a schematic side elevation view of a first embodiment of the termite-monitoring device of the subject invention, mostly in section, with the termite-monitoring device mounted in a paving hole and prior to the actuation of the termite-monitoring device.

FIG. 3 is a schematic side elevation view of the termite-monitoring device of FIG. 1, partially in section, with the termite-monitoring device mounted in a paving hole and after the actuation of the termite-monitoring device.

FIG. 6 is a schematic side elevation view of a second embodiment of the termite-monitoring device of the subject invention, mostly in section, with the termite-monitoring device mounted in a paving hole and prior to the actuation of the termite-monitoring device.

FIG. 7 is a schematic perspective view of a retaining component used in the second embodiment of the termite-monitoring device of the subject invention.

FIG. 8 is a schematic side elevation view of the termite-monitoring device of FIG. 6, mostly in section, with the termite-monitoring device mounted in a termite lure and subsequent to the actuation of the termite-monitoring device.

DESCRIPTION OF THE PREFERRED EMBODIMENTS

Figure 2:
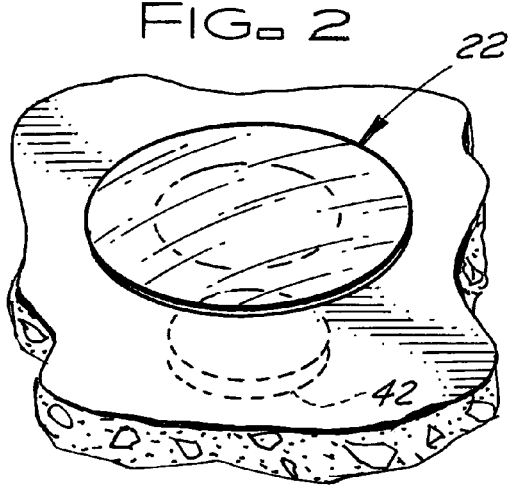
FIG. 2 is a schematic perspective view from above of the termite-monitoring device of FIG. 1, prior to the actuation of the termite-monitoring device, to show the termite indicator button of the termite-monitoring device in its retracted, less visible, position.
Figure 4:
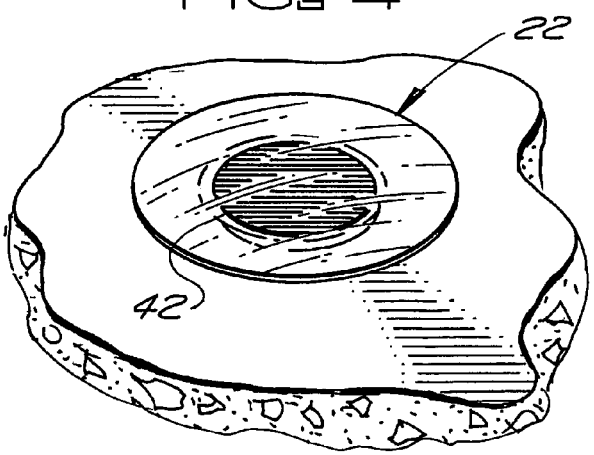
FIG. 4 is a schematic perspective view from above of the termite-monitoring device of FIG. 3, after the actuation of the termite-monitoring device, to show the termite indicator button of the termite-monitoring device in its extended, readily visible, position.
Figure 5:
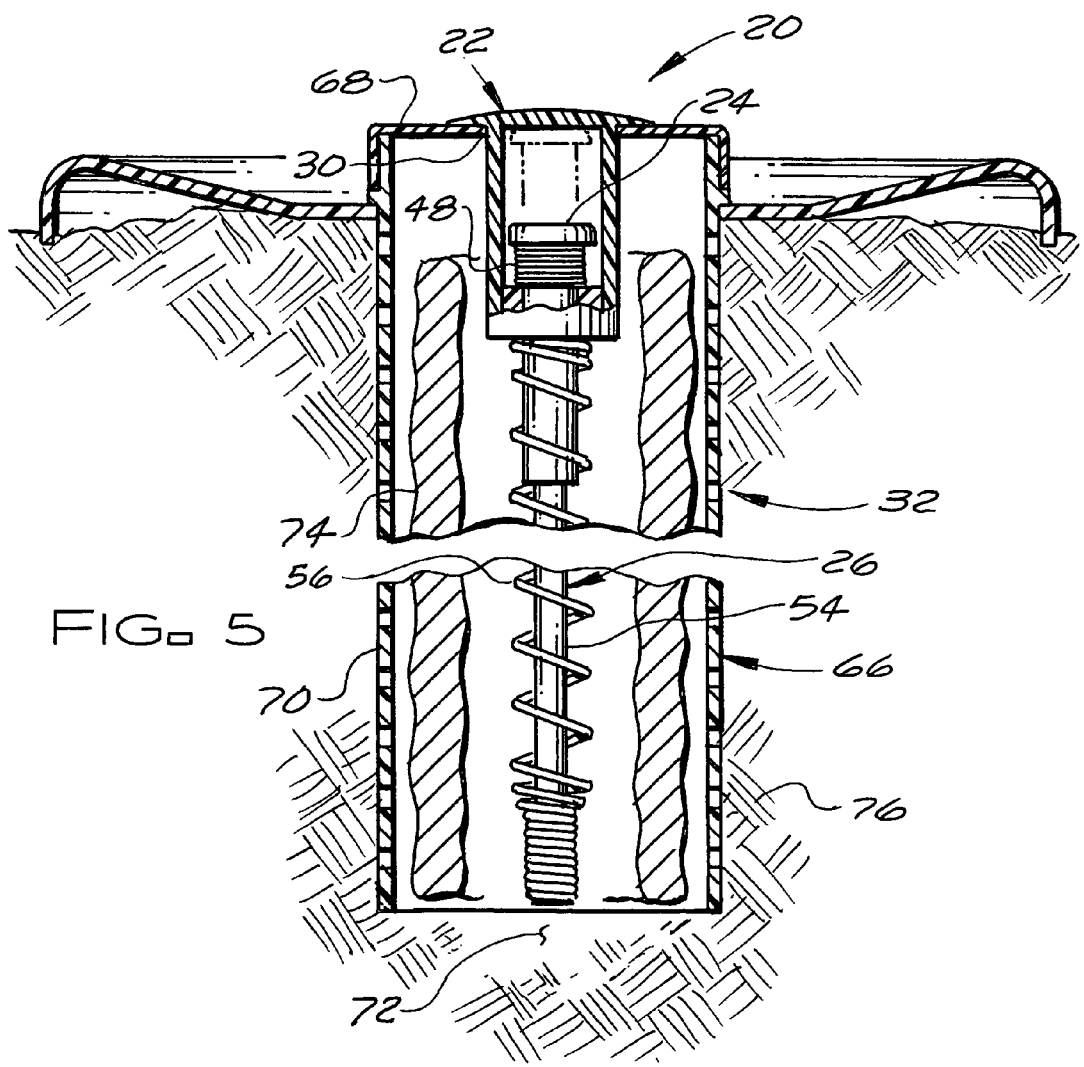
FIG. 5 is a schematic side elevation view of the termite-monitoring device of FIG. 1, partly in section, with the termite-monitoring device mounted in a termite lure and prior to the actuation of the termite-monitoring device.

As shown in FIGS. 1 to 5, a first embodiment 20 of the termite-monitoring device of the subject invention for use in the method of the subject invention includes a closure component 22, a termite presence indicator mechanism 24, and a trigger mechanism 26. The closure component 22 houses the termite presence indicator mechanism 24. In addition, when the termite-monitoring device 20 is mounted in a paving hole 28 or in a hole 30 of a termite lure 32 extending down into the termite lure from the upper surface of the termite lure, as shown in FIG. 5, the closure component 22 closes the upper end of the paving hole 28 or the termite lure hole 30 and seals the interior of the hole from the elements. The closure component 22 includes an upper end portion 34, a tubular housing portion 36 extending downward from the upper end portion, and a lower end portion 38 formed by a plug. The upper end portion 34 of the closure component 22 closes an upper end and the lower end portion 38 of the closure component closes a lower end of the tubular housing portion 36 of the closure component to form a chamber 40 within the closure component for housing the termite presence indicator mechanism 24.

The upper end portion 34 of the closure component 22 is sufficiently transparent that an interior of the closure component chamber 40 can be viewed through the upper end portion of the closure component. Preferably, the upper end portion 34 of the closure component is optically clear or transparent and is a magnifier for magnifying the indicator button 42 of the termite presence indicator mechanism 24 when the indicator button is in its actuated position indicating the presence of termites. The upper end portion 34 of the closure component 22 has a greater outside diameter (e.g. between about 1.5 and about 2 inches and preferably about 1.5 inches) than an outside diameter (e.g. between about 0.75 and about 1 inches and preferably about 0.75 inches) of the tubular housing portion 36 of the closure component whereby an annular peripheral portion of the upper end portion of the closure component forms an annular flange 44 with a bottom surface for engaging an upper surface of a pavement surrounding and adjacent a paving hole 28 in the pavement into which the termite-monitoring device 20 extends or for engaging an upper end surface of a tubular termite lure container surrounding and adjacent the termite lure hole 30 in the upper end surface the tubular termite lure container into which the termite-monitoring device 20 extends. The upper end portion 34 of the closure component 22 has a low profile and a generally convex upper surface that strengthens the closure component so that it can withstand pressures of at least 1500 psi without fracturing. The height "H" of the upper end portion 34 of the closure component 22 ranges from about 0.20 inches or less and preferably, about 0.10 inches or less at the center of the upper end portion of the closure component to about 0.06 inches or less and preferably, about 0.03 inches or less at the annular peripheral edge of the upper end portion 34 of the closure component.

The termite presence indicator mechanism 24 includes an indicator component 46 and a coil actuating spring 48. The indicator component 46 includes the indicator button 42 and a shank portion 50 depending from the indicator button. The indicator button 42 of the indicator component 46 is slidably housed within the chamber 40 of the closure component 22; preferably, has an upper surface that is brightly colored (e.g. red) or otherwise enhanced to be more visible; and has a greater outside diameter than an outside diameter of the shank portion 50 of the indicator component whereby an annular peripheral portion of the indicator button 42 of the indicator component forms an annular flange 52 extending outward from the shank portion. The coil actuating spring 48 is mounted on the shank portion 50 of the indicator component 46 and extends between a bottom surface of the annular flange 52 of the indicator button 42 of the indicator component 46 and an upper surface of the lower end portion 38 of the closure component 22. The shank portion 50 of the indicator component 46 extends from the chamber 40 of the closure component 22 down through a hole in the lower end portion 38 of the closure component 22 and is slidably received within the hole in the lower end portion 38 of the closure component 22.

The trigger mechanism 26 includes a rod 54 and a retaining component that is a coil retaining spring 56. An upper end portion 58 of the rod 54 is received within and secured within a bore in the shank portion 50 of the indicator component 46 and the rod 54 extends downward from the indicator component 46 and a bottom surface of the closure component 22 whereby the rod 54 will extend downward into a paving hole 28 or a termite lure container on which the termite-monitoring device 20 is mounted. A lower end portion 60 of the coil retaining spring 56 is secured to a lower end portion 62 of the rod 54 (e.g. by tightly gripping and affixing itself to the lower end portion 62 of the rod 54). The shank portion 50 of the indicator component 46 extends into and is slideably received within an upper end portion of the coil retaining spring 56 and the upper end 64 of the coil retaining spring 56 engages the bottom surface of the closure component 22 whereby the coil retaining spring 56 retains the coil actuating spring 48 of the termite presence indicator mechanism 24 in a compressed state while the rod 54 is whole. The rod 54 of the trigger mechanism comprises, at least in part, a termite food source portion that when being consumed by termites weakens until the rod 54 is separable at the termite food source portion by opposing forces applied to the rod 54 by the coil retaining spring 56 of the trigger mechanism 26 and the coil actuating spring 48 of the termite presence indicator mechanism 24. Typically, the entire rod 54 is made of a termite food source, such as but not limited to loblolly pine, or at least the midportion of the rod is made a termite food source such as but not limited to loblolly pine. While the termite food source portion of the rod 54 may be toxic or nontoxic, preferably, the termite food source portion of the rod 54 is nontoxic. When the rod 54 is separated by the opposing forces of the coil retaining spring 56 of the trigger mechanism 26 and the coil actuating spring 48 of termite presence indicator mechanism 24, the coil retaining spring 56 no longer retains the coil actuating spring 48 in a compresses state and the coil actuating spring 48 expands longitudinally to move the indicator component 46 from a retracted position in the chamber (shown in FIGS. 1 and 2) where the indicator button 42 is spaced downward from the upper end portion 34 of the closure component 22 and less visible through the upper end portion 34 of the closure component 22 up through the chamber 40 to an extended position in the chamber 40 (shown in FIGS. 3 and 4) where the indicator button 42 is adjacent the upper end portion 34 of the closure component 22, significantly more visible through the upper end portion 34 of the closure component 22 than in the retracted position, and readily visible through the upper end portion 34 of the closure component 22 to indicate the presence of termites.

As shown in FIGS. 6 to 8, a second embodiment 80 of the termite-monitoring device of the subject invention for use in the method of the subject invention includes the closure component 22, the termite presence indicator mechanism 24, and a trigger mechanism 82. The closure component 22 and the termite presence indicator mechanism 24 of the termite-monitoring device 80 are identical to the closure component 22 and the termite presence indicator mechanism 24 of the termite-monitor device 20. Accordingly, the description of these components, set forth above in connection with the termite-monitoring device 20 will not be repeated. However, the structure of the trigger mechanism 82 of the termite-monitoring device 80 differs from the structure of the trigger mechanism 26 of the termite-monitoring device 20 and will be described in detail below.

The trigger mechanism 82 of the termite-monitoring device 80 includes a rod 84 and a retaining component 86. The retaining component 86 includes a spacer 88, such as but not limited to an elongated spacer strip, with an integral upper ring connector element 90 at its upper end that has a greater inside diameter than the outside diameter of the shank portion 50 of the indicator component 46 for slideably mounting the upper end of the retaining component 86 on the shank portion 50 of the indicator component 46 and an integral lower ring connector 92 at its lower end for affixing the lower end of the retaining component 86 to a lower end portion of the rod 84. While the lower end of the retaining component 86 may be affixed to the lower end portion of the rod 84 in other ways, preferably, the lower ring connector 92 of the retaining component has an inside diameter that is less than the outside diameter of the rod 84 and the rod 84 is press fit into the lower ring connector 92 to secure the lower end of the rod 84 to the lower ring connector 92. An upper end portion of the rod 84 is secured within a bore in the shank portion 50 of the indicator component 46 and the rod 84 extends downward from the indicator component and a bottom surface of the closure component 22 whereby the rod 84 will extend downward into a paving hole 28 or a lure container on which the termite-monitoring device 80 is mounted. The upper end of the retaining component 86 engages the bottom surface of the closure component 22 whereby the retaining component 86 retains the coil actuating spring 48 of the termite presence indicator mechanism 24 in a compressed state while the rod 84 is whole. The rod 84 of the trigger mechanism 82 comprises, at least in part, a termite food source portion that when being consumed by termites weakens until the rod is separable at the termite food source portion by opposing forces applied to the rod by the retaining component 86 of the trigger mechanism 82 and the coil actuating spring 48 of the termite presence indicator mechanism 24. When the rod 84 is separated by the opposing forces of the retaining component 86 of the trigger mechanism and the coil actuating spring 48 of termite presence indicator mechanism 24, the coil actuating spring expands longitudinally to move the indicator component 46 from a retracted position in the chamber where the indicator button 42 is spaced downward from the top end portion of the closure component 22 and less visible through the top end portion of the closure component up through the chamber to an extended position where the indicator button 42 is adjacent the top end portion of the closure component 22, significantly more visible through the top end portion of the closure component 22 than in the retracted position, and readily visible through the top end portion of the closure component 22 to indicate the presence of termites.

In the method of the subject invention for detecting the presence of and exterminating termites by exposing the termites to a termiticide, one or more termite-monitoring devices 20 or 80 are mounted in one or more paving holes 28 and/or one or more in-ground located termite lures 32. Typically, the paving holes 28 are spaced apart from each other on about ten foot centers; the paving holes 28 each extend from an upper surface of a concrete or asphalt pavement (e.g. a concrete or asphalt pavement such as but not limited to a slab, walkway, or road) completely through the pavement to at least to a bottom surface of the pavement to expose each paving hole to the ground beneath the pavement for termite access to the paving hole; and the paving holes 28 are formed in a pavement adjacent a building structure. Typically, the in-ground located termite lures 32 (such as but not limited to the in-ground termite lures shown in FIGS. 5 and 8) are spaced apart from each other on about ten foot centers; have tubular containers 66 for containing a termite food source 74; have an above ground exposed upper end surface 68 with a termite lure hole 30 therein that is open from the upper surface of the container to an interior of the container; have in-ground termite access to the interior of the container (e.g. through openings in the tubular sidewall 70 and/or an open bottom end 72); and are located in the ground adjacent a building structure. Typically, the termite food source 74 is separate from the termite food source of the rod 54 or 84 of the termite-monitoring device 20 or 80, but preferably is the same type of food source (e.g. both food sources are loblolly pine) and is placed in each paving hole 28 and/or each termite lure container 66. A termite-monitoring device 20 or 80 for indicating the presence of termites within a paving hole 28 or a termite lure 32 is mounted in each of the paving holes 28 and/or the termite lure holes 30. Once a termite-monitoring device 20 or 80 indicates the presence of termites in a paving hole 28 or a termite lure 32, a termiticide is introduced into the paving hole 28, the termite lure 32, and/or the ground 76 adjacent the paving hole 28 or termite lure 32 (including but not limited to the ground beneath the paving hole or termite lure) to expose the termites to the termiticide as the termites pass between a termite colony and the paving hole 28 or termite lure 32 and/or feed within the paving hole 28 or termite lure 32.

Preferably, the closure component 22 and the indicator component 46 of the termite presence indicator mechanism 24 are made of durable thermoplastic polymers; the coil springs 48 and 56 are made of spring steel; and the spacer member 88 is made of a durable thermoplastic polymer. The coil spring 56 and the spacer 88 are each sufficiently stiff or strong to retain the coil spring 48 of the indicator component 46 compressed while the rod of the trigger mechanism 26 or 82 is whole.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A termite-monitoring device with an integral termite presence indicator for use in determining a presence of termites in ground beneath a pavement or in ground adjacent an in ground located termite lure, comprising:

a closure component, a termite presence indicator mechanism, and a trigger mechanism;

the closure component being for housing the termite presence indicator mechanism and for closing an upper end of a paving or termite lure hole in which the termite-monitoring device is mounted; the closure component comprising an upper end portion, a tubular housing portion extending downward from the upper end portion, and a lower end portion; the upper end portion of the closure component closing an upper end and the lower end portion of the closure component closing a lower end of the tubular housing portion of the closure component to form a chamber within the closure component for housing the termite indicator mechanism;

the upper end portion of the closure component being sufficiently transparent that an interior of the closure component chamber can be viewed through the upper end portion; the upper end portion of the closure component having a greater outside diameter than an outside diameter of the tubular housing portion of the closure component whereby an annular peripheral portion of the upper end portion of the closure component forms an annular flange with a bottom surface for engaging a surface surrounding and adjacent a hole in which the termite-monitoring device is mounted;

the termite presence indicator mechanism comprising an indicator component and a coil actuating spring; the indicator component having a top indicator button and a shank portion depending from the indicator button; the indicator button of the indicator component being slidably housed within the chamber of the closure component and having a greater outside diameter than an outside diameter of the shank portion of the indicator component whereby an annular peripheral portion of the indicator button of the indicator component forms an annular flange extending outward from the shank portion; the coil actuating spring being mounted on the shank portion of the indicator component and extending between a bottom surface of the annular flange of the indicator button of the indicator component and an upper surface of the lower end portion of the closure component; the shank portion of the indicator component extending from the chamber of the closure component down through a hole in the lower end portion of the closure component and being slidably received within the hole in the lower end portion of the closure component;

the trigger mechanism comprising a rod and a retaining component means; an upper end portion of the rod is secured to the indicator component and the rod extends downward from the indicator component and a bottom surface of the closure component whereby the rod will extend downward into a hole in which the termite-monitoring device is mounted; a lower end portion of the retaining component means is secured to a lower end portion of the rod and an upper end of the retaining component means engages the bottom surface of the closure component whereby the retaining component means retains the coil actuating spring of the termite presence indicator mechanism in a compressed state while the rod is whole; the rod of the trigger mechanism comprising, at least in part, a termite food source portion that when being consumed by termites weakens until the rod is separable at the termite food source portion by opposing forces applied to the rod by the retaining component means of the trigger mechanism and the coil actuating spring of the termite presence indicator mechanism; and when the rod is separated by the opposing forces of the retaining component means of the trigger mechanism and the coil actuating spring of termite presence indicator mechanism, the coil actuating spring moving the indicator component from a retracted position in the chamber where the indicator button is spaced downward from the upper end portion of the closure component and less visible through the upper end portion of the closure component up through the chamber to an extended position where the indicator button is adjacent the upper end portion of the closure component, significantly more visible through the upper end portion of the closure component than in the retracted position, and readily visible through the upper end portion of the closure component to indicate the presence of termites.

2. The termite-monitoring device with an integral termite presence indicator, according to claim 1, wherein:

the retaining component means is a coil retaining spring.

3. The termite-monitoring device with an integral termite presence indicator, according to claim 1, wherein:

the retaining component means is a spacer strip with an upper connector element that is slideably mounted on the shank portion of the indicator component and engages a bottom surface of the closure component and a lower connector element that is affixed to the lower portion of the rod of the trigger mechanism.

4. The termite-monitoring device with an integral termite presence indicator, according to claim 1, wherein:

the indicator button is colored to be readily visible through the upper end portion of the closure component when the indicator component has been moved upward by the actuating spring and the indicator button is adjacent the upper end portion of the closure component.

5. The termite-monitoring device with an integral termite presence indicator, according to claim 4, wherein:

the upper end portion of the closure component is optically clear.

6. The termite-monitoring device with an integral termite presence indicator, according to claim 5, wherein:

the upper end portion of the closure component is a magnifying lens to enhance the visuality of the indicator button through the upper end portion of the closure component when the indicator component has been moved upward by the actuating spring and the indicator button is adjacent the upper end portion of the closure component.

7. The termite-monitoring device with an integral termite presence indicator, according to claim 6, wherein:

the upper end portion of the closure component has a low profile and a generally convex upper surface.

8. The termite-monitoring device with an integral termite presence indicator, according to claim 6, wherein:

the upper end portion of the closure component has a low profile, a generally convex upper surface, and is able to withstand a pressure of 1500 psi without fracturing; the outside diameter of the upper end portion of the closure component is about 1.5 inches in diameter, the tubular housing portion of the closure component is about 0.75 inches; and the vertical distance between the lower surface of the annular flange and the generally convex upper surface of the upper end portion of the closure component ranges from about 0.03 inches or less at the peripheral edges of the closure component to about 0.09 inches or less at the center of the closure component.

9. The termite-monitoring device with an integral termite presence indicator, according to claim 1, wherein:

the upper end portion of the closure component is optically clear.

10. The termite-monitoring device with an integral termite presence indicator, according to claim 1, wherein:

the upper end portion of the closure component is a magnifying lens to enhance the visuality of the indicator button through the upper end portion of the closure component when the indicator component has been moved upward by the actuating spring and the indicator button is adjacent the upper end portion of the closure component.

11. The termite-monitoring device with an integral termite presence indicator, according to claim 1, wherein:

the upper end portion of the closure component can withstand a pressure of 1500 psi without fracturing.

12. The termite-monitoring device with an integral termite presence indicator, according to claim 1, wherein:

the upper end portion of the closure component has a low profile and a generally convex upper surface; and the outside diameter of the upper end portion of the closure component is about 1.5 inches; and the outside diameter of tubular housing portion of the closure component is about 1 inch or less.

13. A method for detecting the presence of termites in ground beneath a concrete or asphalt pavement, comprising:

forming a paving hole that extends from an upper surface of a concrete or asphalt pavement completely through the pavement to at least to a bottom surface of the pavement whereby the bottom of the paving hole is exposed to ground beneath the pavement for termite access to the paving hole;

providing a termite-monitoring device comprising a closure component, a termite presence indicator mechanism, and a trigger mechanism;

the closure component comprising an upper end portion, a tubular housing portion extending downward from the upper end portion, and a lower end portion; the upper end portion of the closure component closing an upper end and the lower end portion of the closure component closing a lower end of the tubular housing portion of the closure component to form a chamber within the closure component for housing the termite presence indicator mechanism; the upper end portion of the closure component being sufficiently transparent that an interior of the closure component chamber can be viewed through the upper end portion; the upper end portion of the closure component having a greater outside diameter than an outside diameter of the tubular housing portion of the closure component whereby an annular peripheral portion of the upper end portion of the closure component forms an annular flange with a bottom surface for engaging an upper surface of a pavement surrounding and adjacent a paving hole in the pavement into which the termite-monitoring device extends;

the termite presence indicator mechanism comprising an indicator component and a coil actuating spring; the indicator component having a top indicator button and a shank portion depending from the indicator button; the indicator button of the indicator component being slideably housed within the chamber of the closure component and having a greater outside diameter than an outside diameter of the shank portion of the indicator component whereby an annular peripheral portion of the indicator button of the indicator component forms an annular flange extending outward from the shank portion; the coil actuating spring being mounted on the shank portion of the indicator component and extending between a bottom surface of the annular flange of the indicator button of the indicator component and an upper surface of the lower end portion of the closure component; the shank portion of the indicator component extending from the chamber of the closure component down into a hole in the lower end portion of the closure component and being slidably received within the hole in the lower end portion of the closure component;

the trigger mechanism comprising a rod and a retaining component means; an upper end portion of the rod is secured to the indicator component and the rod extends downward from the indicator component and a bottom surface of the closure component whereby the rod will extend downward into a paving hole in which the termite-monitoring device is mounted; a lower end portion of the retaining component means is secured to a lower end portion of the rod and an upper end of the retaining component means engages the bottom surface of the closure component whereby the retaining component means retains the coil actuating spring of the termite presence indicator mechanism in a compressed state while the rod is whole; the rod of the trigger mechanism comprising, at least in part, a termite food source portion that when being consumed by termites weakens until the rod is separable at the termite food source portion by opposing forces applied to the rod by the retaining component means of the trigger mechanism and the coil actuating spring of the termite presence indicator mechanism; and when the rod is separated by the opposing forces of the retaining component means of the trigger mechanism and the coil actuating spring of termite presence indicator mechanism, the coil actuating spring moving the indicator component from a retracted position in the chamber where the indicator button is spaced downward from the upper end portion of the closure component and less visible through the upper end portion of the closure component up through the chamber to an extended position where the indicator button is adjacent the upper end portion of the closure component, significantly more visible through the upper end portion of the closure component than in the retracted position, and readily visible through the upper end portion of the closure component to indicate the presence of termites;

mounting the termite-monitoring device in the paving hole with the tubular housing portion of the closure component and the trigger mechanism extending down into the paving hole and annular flange portion of the upper end portion of the closure component closing and sealing an upper end of the paving hole; and monitoring the termite-monitoring device to detect the presence of termites.

14. The method for detecting the presence of termites in ground beneath a concrete or asphalt pavement according to claim 13, wherein:

the indicator button is colored to be readily visible through the upper end portion of the closure component when the indicator component has been moved upward by the actuating spring and the indicator button is adjacent the upper end portion of the closure component.

15. The method for detecting the presence of termites in ground beneath a concrete or asphalt pavement according to claim 13, wherein:

the upper end portion of the closure component is a magnifying lens to enhance the visuality of the indicator button through the upper end portion of the closure component when the indicator component has been moved upward by the actuating spring and the indicator button is adjacent the upper end portion of the closure component.

16. The method for detecting the presence of termites in ground beneath a concrete or asphalt pavement according to claim 13, wherein:

the upper end portion of the closure component has a low profile and a generally convex upper surface.

17. The method for detecting the presence of termites in ground beneath a concrete or asphalt pavement according to claim 13, wherein:

the upper end portion of the closure component has a low profile, a generally convex upper surface, and is able to withstand a pressure of 1500 psi without fracturing; the outside diameter of the upper end portion of the closure component is about 1.5 inches in diameter; the tubular housing portion of the closure component is about 0.75 inches; and the vertical distance between the lower surface of the annular flange and the generally convex upper surface of the upper end portion of the closure component ranges from about 0.03 inches or less at the peripheral edges of the closure component to about 0.09 inches or less at the center of the closure component.

18. The method for detecting the presence of termites in ground beneath a concrete or asphalt pavement according to claim 13, wherein:

the indicator button is colored to be readily visible through the upper end portion of the closure component when the indicator component has been moved upward by the actuating spring and the indicator button is adjacent the upper end portion of the closure component;

the upper end portion of the closure component is a magnifying lens to enhance the visuality of the indicator button through the upper end portion of the closure component when the indicator component has been moved upward by the actuating spring and the indicator button is adjacent the upper end portion of the closure component; and the upper end portion of the closure component has a low profile and a generally convex upper surface.

19. The method for detecting the presence of termites in ground beneath a concrete or asphalt pavement according to claim 13, wherein:

placing a termite food source in the hole in addition to the termite food source portion of the rod; and exterminating the termites with a termiticide once the termites are detected.

20. A termite-monitoring device with an integral termite presence indicator for use in determining a presence of termites in ground beneath a pavement or in ground adjacent an in ground located termite lure, comprising:

a closure component, a termite presence indicator mechanism, and a trigger mechanism;

the closure component being for housing the termite presence indicator mechanism and for closing an upper end of a paving hole extending from an upper surface of a concrete or asphalt pavement completely through the pavement to at least to a bottom surface of the pavement whereby the bottom of the paving hole is exposed to ground beneath the pavement for termite access to the paving hole or for closing a container hole in an above ground exposed upper end surface of an in ground located termite lure having a tubular container for containing a termite food source that provides in ground termite ingress to and egress from the container; the closure component comprising an upper end portion, a tubular housing portion extending downward from the upper end portion, and a lower end portion; the upper end portion of the closure component closing an upper end and the lower end portion of the closure component closing a lower end of the tubular housing portion of the closure component to form a chamber within the closure component for housing the termite indicator mechanism;

the upper end portion of the closure component being sufficiently transparent that an interior of the closure component chamber can be viewed through the upper end portion; the upper end portion of the closure component having a greater outside diameter than an outside diameter of the tubular housing portion of the closure component whereby an annular peripheral portion of the upper end portion of the closure component forms an annular flange with a bottom surface for engaging an upper surface of a pavement surrounding and adjacent a paving hole in the pavement into which the termite-monitoring device extends or for engaging an upper end surface of a tubular container surrounding and adjacent a container hole in the upper end surface a tubular termite lure container into which the termite-monitoring device extends;

the termite presence indicator mechanism comprising an indicator component and a coil actuating spring; the indicator component having a top indicator button and a shank portion depending from the indicator button; the indicator button of the indicator component being slidably housed within the chamber of the closure component and having a greater outside diameter than an outside diameter of the shank portion of the indicator component whereby an annular peripheral portion of the indicator button of the indicator component forms an annular flange extending outward from the shank portion; the coil actuating spring being mounted on the shank portion of the indicator component and extending between a bottom surface of the annular flange of the indicator button of the indicator component and an upper surface of the lower end portion of the closure component; the shank portion of the indicator component extending from the chamber of the closure component down through a hole in the lower end portion of the closure component and being slidably received within the hole in the lower end portion of the closure component;

the trigger mechanism comprising a rod and a retaining component means; an upper end portion of the rod is secured to the indicator component and the rod extends downward from the indicator component and a bottom surface of the closure component whereby the rod will extend downward into a paving hole or a lure container hole in which the termite-monitoring device is mounted; a lower end portion of the retaining component means is secured to a lower end portion of the rod and an upper end of the retaining component means engages the bottom surface of the closure component whereby the retaining component means retains the coil actuating spring of the termite presence indicator mechanism in a compressed state while the rod is whole; the rod of the trigger mechanism comprising, at least in part, a termite food source portion that when being consumed by termites weakens until the rod is separable at the termite food source portion by opposing forces applied to the rod by the retaining component means of the trigger mechanism and the coil actuating spring of the termite presence indicator mechanism; and when the rod is separated by the opposing forces of the retaining component means of the trigger mechanism and the coil actuating spring of termite presence indicator mechanism, the coil actuating spring moving the indicator component from a retracted position in the chamber where the indicator button is spaced downward from the upper end portion of the closure component and less visible through the upper end portion of the closure component up through the chamber to an extended position where the indicator button is adjacent the upper end portion of the closure component, significantly more visible through the upper end portion of the closure component than in the retracted position, and readily visible through the upper end portion of the closure component to indicate the presence of termites.

* * * * *